Feb. 17, 1953 W. C. RICHARDSON 2,628,565

FLUID OPERATED RECIPROCATING PUMP FOR DRILLED WELLS

Filed Sept. 12, 1946 8 Sheets-Sheet 1

William C. Richardson
INVENTOR.

BY J. Preston Swecker
HIS ATTORNEY.

William C. Richardson
INVENTOR.

BY [signature]
HIS ATTORNEY.

William C. Richardson
INVENTOR.

BY J. Preston Swecker
HIS ATTORNEY.

William C. Richardson
INVENTOR.

BY J. Preston Swecker
HIS ATTORNEY.

William C. Richardson
INVENTOR.
BY [signature]
HIS ATTORNEY.

William C. Richardson
INVENTOR.

BY J. Preston Swecker
HIS ATTORNEY.

FLUID OPERATED RECIPROCATING PUMP FOR DRILLED WELLS

Filed Sept. 12, 1946 8 Sheets-Sheet 7

William C. Richardson
INVENTOR.

BY J. Preston Swecker
HIS ATTORNEY.

Feb. 17, 1953 W. C. RICHARDSON 2,628,565

FLUID OPERATED RECIPROCATING PUMP FOR DRILLED WELLS

Filed Sept. 12, 1946 8 Sheets-Sheet 8

William C. Richardson
INVENTOR.

BY J. Preston Swecker
HIS ATTORNEY.

Patented Feb. 17, 1953

2,628,565

UNITED STATES PATENT OFFICE 2,628,565

FLUID OPERATED RECIPROCATING PUMP FOR DRILLED WELLS

William C. Richardson, near Electra, Tex.

Application September 12, 1946, Serial No. 696,483

10 Claims. (Cl. 103—46)

This invention relates to improvements in reciprocating pumps of the character used for pumping oil and other fluids from the bottom of a deep well such as an oil well. The invention is an improvement on the reciprocating pump set forth in my prior Patent No. 2,245,501 granted June 10, 1941.

Most deep well pumps as used heretofore have required a reciprocating piston operatively mounted in the cylinder and actuated by a rod that extends from a point in the well to the surface of the ground. Where the well is of considerable depth, such a pump has many objections including the excessive power required for operation of the piston, the amount of material necessary to form the piston rod due to the great length required for the latter, etc. It has been proposed heretofore to use a hydraulically operated pump in which the reciprocating pistons were operated hydraulically by fluid power transmitted thereto downwardly through the well. As set forth in my patent above mentioned, such a pump required valve mechanism also located in the well adjacent the pump pistons to act in response thereto for controlling the supply of fluid power to the pistons.

The primary object of this invention is to improve the construction of the pump to provide a more effective control of the supply of fluid thereto for power operation of the pump.

Another object of the invention is to provide for the location of the control valves above ground and so remote from the pump pistons that they are not directly connected therewith, whereby the valve mechanism may be assembled in such relation that ready access may be had thereto for adjustment or control.

A further object of the invention is to provide for a operation of a hydraulic pump by means of the crude oil that is pumped out of the well or by an oil that is mixed therewith so that the discharge side of the power means of the pump can be connected directly with the discharge side of the pump itself through a common conduit and thereby simplify the structure and enable it to be installed more readily in the well.

A still further object of the invention is to improve the pump structure whereby the piston that operates the plunger of the pump is connected thereto so as to function simultaneously to draw oil into the plunger and pump it upward and out of the top of the well.

This invention utilizes a hydraulically operated pump with valve mechanism for controlling the supply of fluid to the power side of the pump, which valve mechanism is not directly connected with the pump whereby it may be disposed remotely therefrom, as for instance on the surface of the ground to provide for ready access thereto, and a practical construction and assembly of the valve mechanism. This is made possible because the valve mechanism is actuated in response to a hydraulic back pressure which is created when the power piston reaches a point at the limit of its stroke, to shift the valve mechanism and thereby change the direction of the fluid acting on the power means of the pump. Thus, the force that actuates the valve mechanism functions automatically by being transmitted through the hydraulic system without direct connection between the valve mechanism and the power side of the pump through any mechanical means. Thus the valve mechanism will operate automatically so long as pump pressure is maintained in the system.

It is preferred that the pump be so constructed as to be double-acting whereby it functions to cause a pumping action both on the downstroke and on the upstroke of the pump piston, and the pump discharges through a common outlet which forms the conduit for the fluid being pumped out of the well, so that the necessity for an extra conduit is eliminated. This is made possible by the utilization of the crude oil, or any other fluid that is being pumped, as the power fluid, thereby saving the necessity for additional storage and mechanism that would be required if different fluids were used.

Provision is made for draining the tubing of the pump system of fluid in a simple and expeditious manner when it is desired to pull the tubing and pump mechanism out of the well. The same fluid outlet may be used to discharge the oil from the plurality of telescoped tubes connecting with the pump conduit, due to the manner in which these are interconnected and to the location of the discharge opening with respect thereto.

The valve mechanism preferably utilizes simple full opening valves that will be moved to open or closed positions as desired without the necessity for needle valves, pilot valves or other small valves that would constrict passages, presenting the possibility of clogging and complicate the system and its operation and render it less effective in use.

The invention is illustrated in certain embodiments in the accompanying drawings in which.

Figures 1, 9, 10, 11, 12:
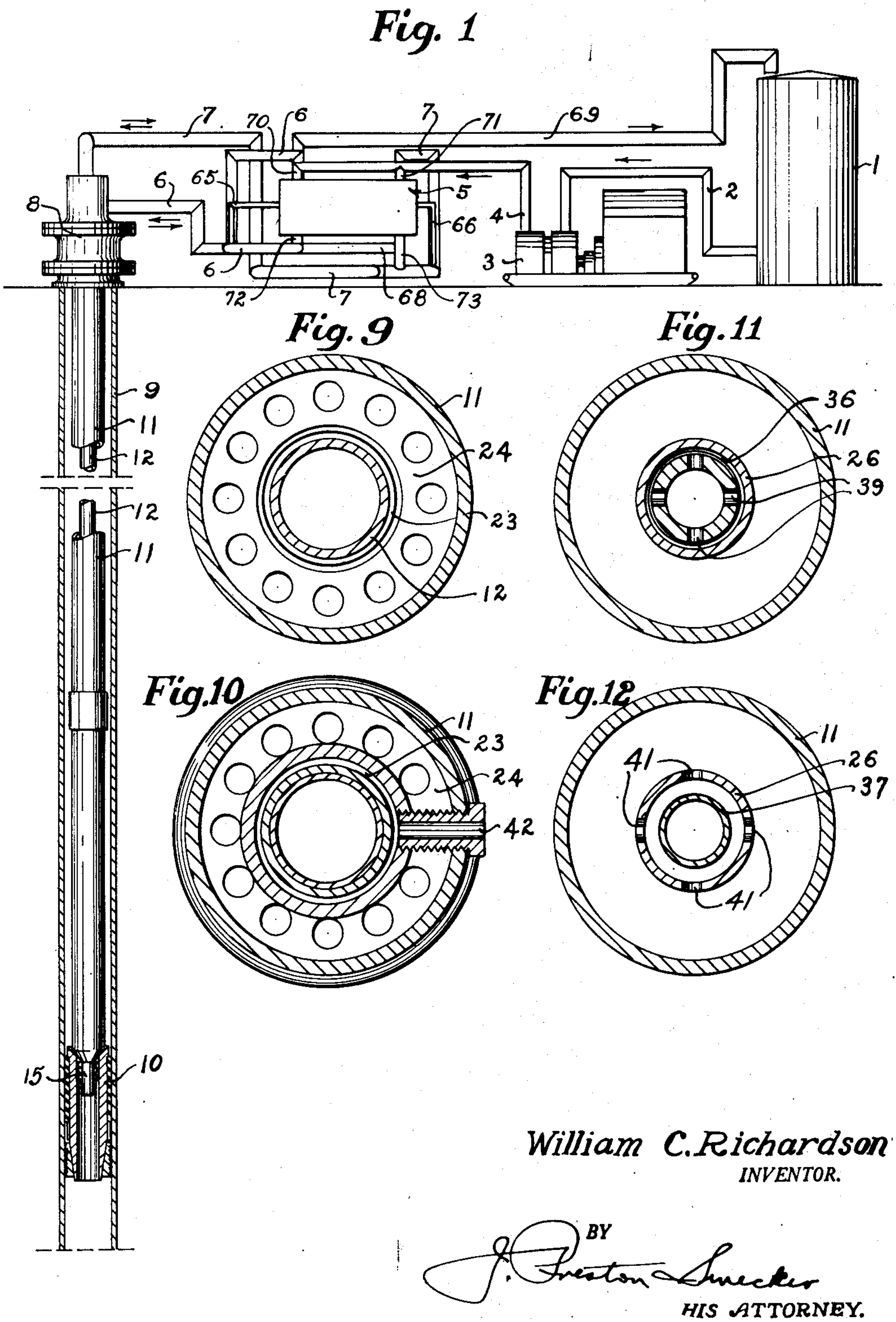
Fig. 1 is a diagrammatic view with parts in section showing the operating mechanism and pump structure installed in a well.
Fig. 9 is a similar view on the line 9—9 in Fig. 3.
Fig. 10 is a similar view on the line 10—10 in Fig. 3.
Fig. 11 is a similar view on the line 11—11 in Fig. 4.
Fig. 12 is a similar view on the line 12—12 in Fig. 4.

The invention is shown as applied to a pump of the character used for pumping oil from the bottom of a deep well. The hydraulic system is illustrated diagrammatically in Figs. 1 and 2, both for supplying the liquid which functions under pressure to actuate the pump and also to receive the oil or other fluid pumped from the well. This system uses pipe connections generally for the purpose of forming conduits for the fluid, which conduits are adapted to be connected with their main storage tank generally designated at 1 which will serve not only as a supply tank for the operating fluid, but also as a receptacle to which the fluid from the well is to be discharged.

The operating fluid or liquid is directed from the tank 1 through a pipe 2 to a power operated pump 3. The pump 3 directs the liquid under pressure through a pipe 4 to valve mechanism 5.

Figures 5, 6, 7, 8:
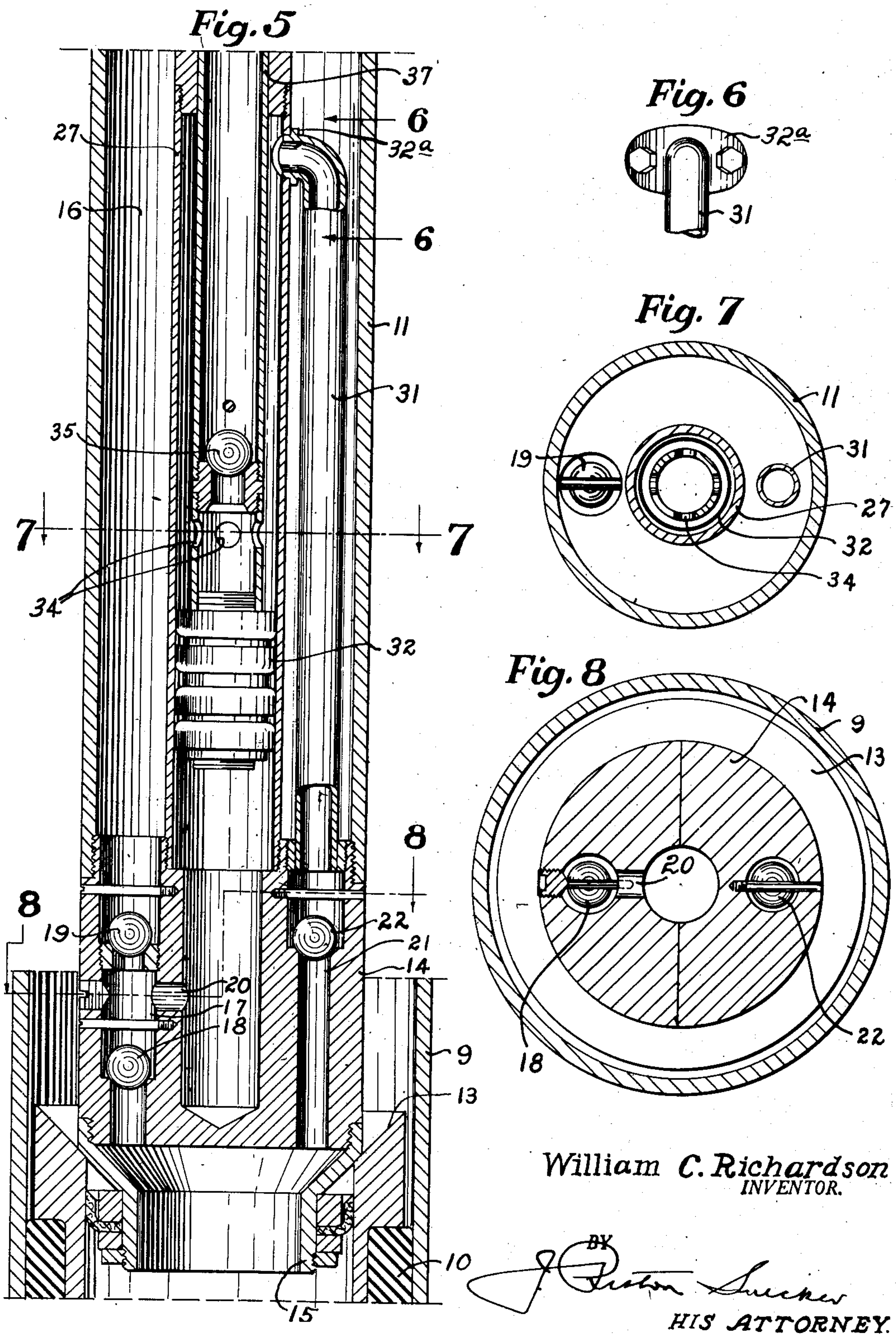
Fig. 6 is a detailed elevation of a pipe connection with the pump, taken on the line 6—6 of Fig. 5.
Fig. 7 is a cross section through the pump on the line 7—7 of Fig. 5.
Fig. 8 is a similar view on the line 8—8 of Fig. 5.

The valve mechanism 5 will be described hereafter more in detail but it is shown as having spaced valve sections connected respectively through pipes 6 and 7 that extend to a casing head 8 which serves to close the upper end of the usual well casing 9 and is located ordinarily at the surface of the ground. The casing 9 extends downwardly in the well as shown in Figs. 1 and 5 to a point near the bottom thereof and receives in the lower end portion thereof the oil or other fluid that flows into the well and is discharged therefrom. The casing 9 is shown as having a packer 10 for supporting the pump mechanism in the casing.

*Pump structure*

Figure 3:
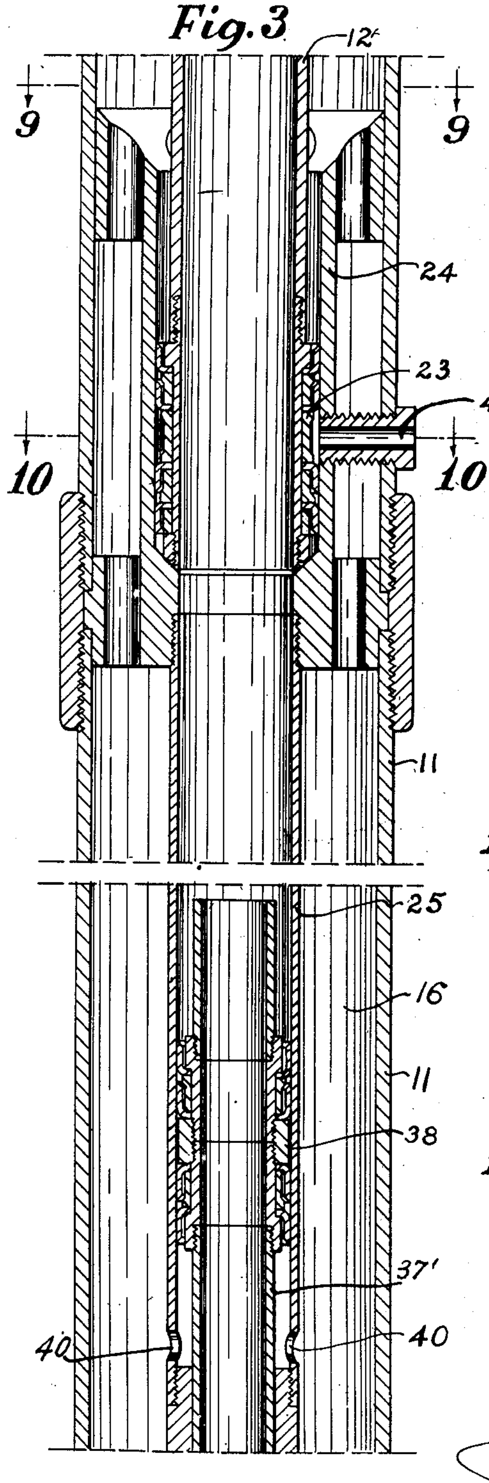
Figs. 3, 4 and 5 are vertical sectional views through the operating parts of the pump taken respectively at the upper, middle and lower portions thereof.

Connected with the casing head 8 and extending downwardly in the casing 9 are telescoped tubings 11 and 12, as shown particularly in Figs. 1 and 3, which tubings 11 and 12 are spaced from each other as well as from the casing 9 to permit fluid flow between the tubings 11 and 12. Each of these tubings 11 and 12 may be formed of a series of joints of pipe connected together by couplings in a manner well known in the art and forming respectively sections that may be assembled substantially as shown in the drawings.

The tubing 11 is shown as extending downwardly to the packer 10 in the form illustrated and may be supported upon a seat 13 in the packer to form a support for the tubing 11. The lower end of the tubing 11 has a fitting 14 fixed thereto with a depending sleeve 15 in sealing relation with the packer 10, permitting a flow of fluid upward through the sleeve 15 and the fitting 14 into the space between the tubings 11 and 12, which space forms an annular passageway and is designated generally at 16 in Figs. 3 to 5.

The fitting 14 has a passageway 17 extending upwardly therethrough with downwardly seating check valves 18 and 19 in spaced relation from each other for controlling the flow through said passageway, and which check valves are disposed on opposite sides of a port 20 into the interior of the fitting as hereinafter described.

A separate passageway is shown at 21 through fitting 14. The passageway 21 is controlled by a downwardly seating check valve 22 for permitting upward flow of fluid therethrough while preventing downward discharge thereof.

As shown in Fig. 3, the inner tubing 12 does not extend continuously to the lower end of the outer tubing 11 but terminates in a packing head 23 which is seated in a spider 24 that surrounds the tubing 12 within the tubing 11 and has spaced passages through said spider for fluid circulation between the tubings.

Extending downwardly from the spider 24 in axial alignment with the inner tubing 12 so as to form an extension thereof are cylinders 25 and 26 which form power cylinders as hereinafter described, and a pump barrel 27 which forms a pump cylinder, which has a fitting 14 on the lower end thereof, as shown in Fig. 5.

The pump cylinder 28 adjacent the upper end thereof is connected with a tube 31 by means of a flanged coupling 32*a* as will be evident from Fig. 6. The tube 31 extends downwardly beside the barrel 27 and is connected with the fitting 14 at the upper end of the passageway 21. Thus the fluid may flow from the bottom of the well through the passageway 21, past the check valve 22, and through the tube 31 into the upper end of the cylinder 28.

A pump piston 32 is mounted in the pump cylinder 28, which piston is imperforate without a fluid passageway therethrough. A tubular piston rod 37 is connected with the piston 32 and extends upwardly therefrom as shown in Fig. 5. The tubular piston rod 37 is provided with orifices 34 in the lower end portion thereof for admitting fluid into the piston rod above the piston 32 from within the upper portion of the cylinder 28. A downwardly seating check valve 35 controls the flow of fluid through the tubular piston rod 37.

The tubular piston rod 37 extends upwardly to a point in the power cylinder 26 where it is connected with a power piston generally designated at 36 operatively mounted in the cylinder 26. A second tubular piston rod 37' is connected also with the piston 36 and extends upwardly therefrom to the cylinder 25 where the piston rod 37' is connected to a second power piston 38 operatively mounted in the cylinder 25. These parts comprising the piston rods 37 and 37' and the pistons 32, 36 and 38 constitute a unit for operation by fluid pressure to pump the fluid out of the bottom of the well as hereinafter described more in detail.

The tubular piston rod 37' has orifices 39 at the lower end thereof for communication therethrough between the cylinder 30 above the piston 36 and the interior of the tubular piston rod. Communication is established between the passageway 16 and the lower ends of the cylinders 29 and 30 through orifices 40 and 41 respectively formed in the sides of the cylinders 25 and 26 at points below the pistons 38 and 36 respectively.

Provision is made for draining both of the tubings 11 and 12 into the casing 9 whenever it is desired to pull the tubings out of the well. This is made possible by a nipple 42 as shown in Figs. 3 and 10. The nipple 42 is threaded through the tubing 11 and through the inner wall of the spider 24 at a point where it is normally sealed by the packing head 23. However, upon pulling the tubing 12 upward relative to the tubing 11, the packing head 23 is drawn out of the spider 24 and any fluid contained in the tubing 12 can flow out through the nipple 42 into the casing. Then the fluid contained in the upper portion of the tubing 11 above the nipple 42 also will be discharged through the nipple into the casing.

*Valve mechanism*

Figure 2:
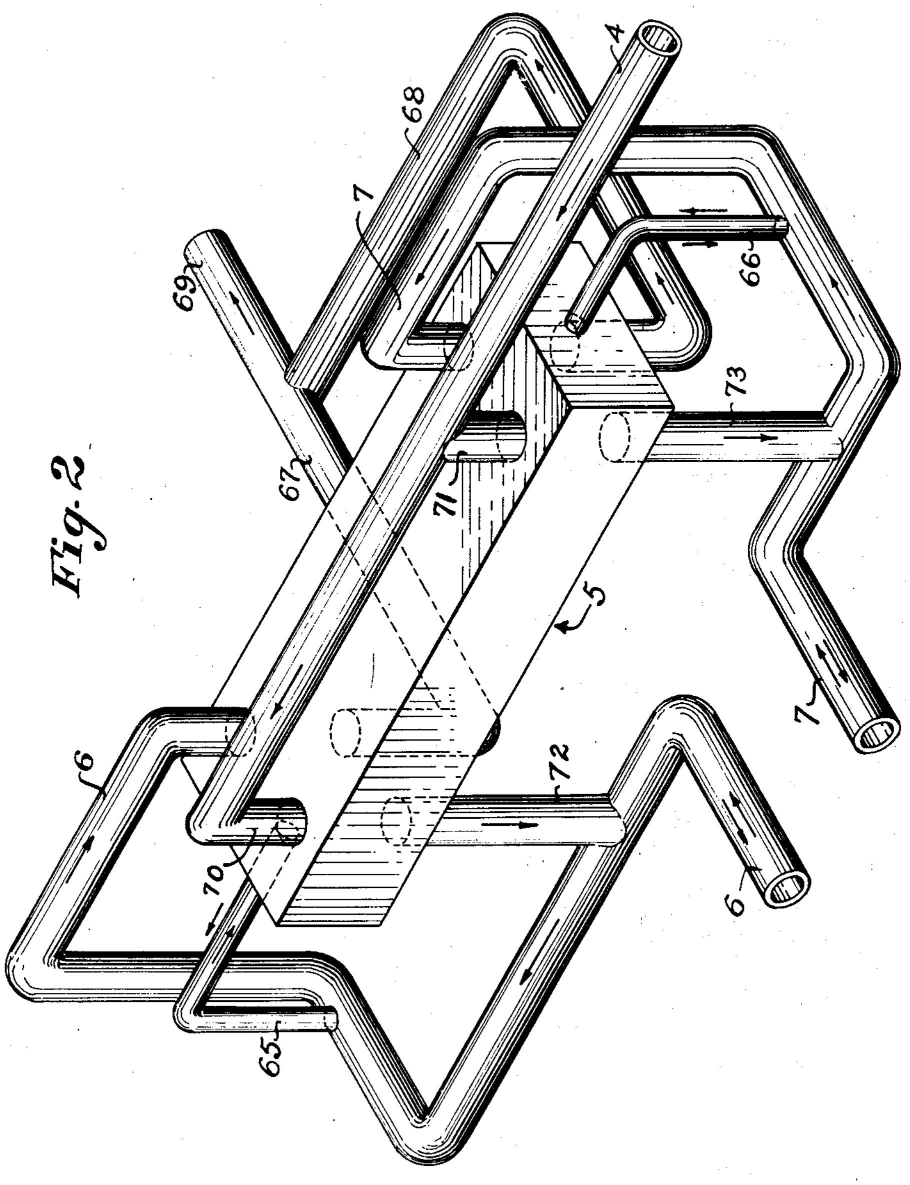
Fig. 2 is a diagrammatic perspective view of the hydraulic system that is connected with the pump mechanism.

The valve mechanism diagrammatically illustrated in Figs. 1 and 2 and designated at 5 therein is shown more in deteail in Figs. 13 to 18. In the form here shown, slide valves are used for controlling the flow of fluid and are arranged in pairs at the opposite ends of the valve mechanism. Four of these valves are shown as designated at 43, 44, 45 and 46. Each of the valves is shown as slidably mounted in a valve chamber and as having a reduced section arranged to provide for fluid flow through the chamber when said reduced section is in registry with the ports of the chamber according to the positions of the valves 43 and 46 in Figs. 13 and 17, and to prevent fluid flow therethrough when the reduced sections of the valves are out of registry with the ports according to the positions of the valves 44 and 45 therein.

The valves 43 and 45 are connected directly together by a rigid valve stem 47 extending therebetween. Similarly the valves 44 and 46 are secured together by a valve stem 48. These valve stems 47 and 48 are slidably mounted in the valve structure and rigidly connect the corresponding valves together for unitary action to corresponding positions at opposite ends of the valve mechanism.

The valve stems 47 and 48 are connected together by plates 49 and 50 held in spaced relation by coiled springs 51 and 52 which are sleeved over the respective valve stems 47 and 48. The separation of the plates 49 and 50 is limited by stops 53 fixed to the respective valve stems.

It is desired to secure valves in extreme positions and to provide for the snap-action thereof when shifting from one extreme position to another. Provision is made to accomplish this result by means of slide members 54 disposed on the respective opposite side bars 54a of the valve mechanism. The bars 54a are fixed against endwise sliding movement but permit relative sliding movement of slide members 54 thereon and relative theretof. Confined within each of the slide members 54 and side bars 54a is a latch 55 mounted therein for freedom of swinging movement according to the endwise shifting of the slide members 54.

Figure 13:
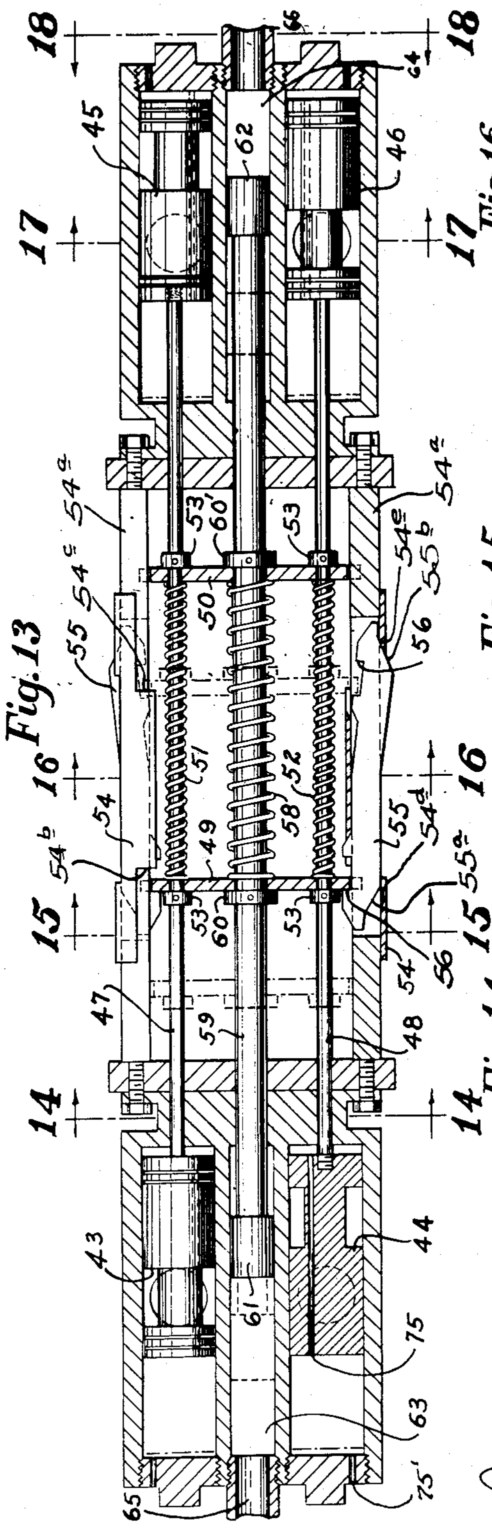
Fig. 13 is a horizontal sectional view through one form of valve mechanism that may be used to control the operation of the pump.
Figure 16:
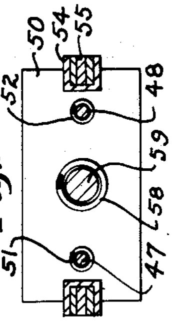
Fig. 16 is a similar view on the line 16—16 in Fig. 13.
Figure 18:
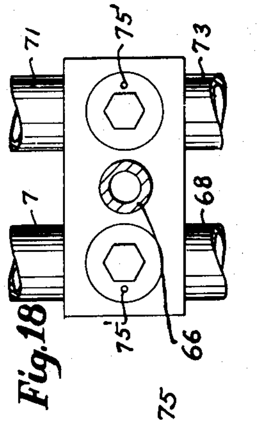
Fig. 18 is a similar view on the line 18—18 in Fig. 13.
Figure 15:
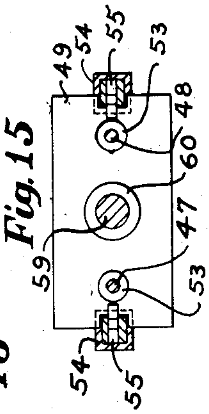
Fig. 15 is a similar view on the line 15—15 in Fig. 13.
Figure 17:
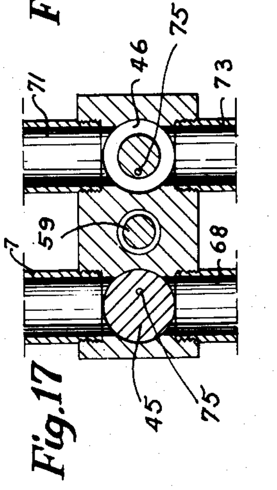
Fig. 17 is a similar view on the line 17—17 in Fig. 13.
Figure 14:
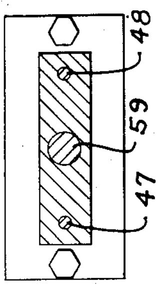
Fig. 14 is a detailed cross section therethrough on the line 14—14 in Fig. 13.
Figures 19, 24:
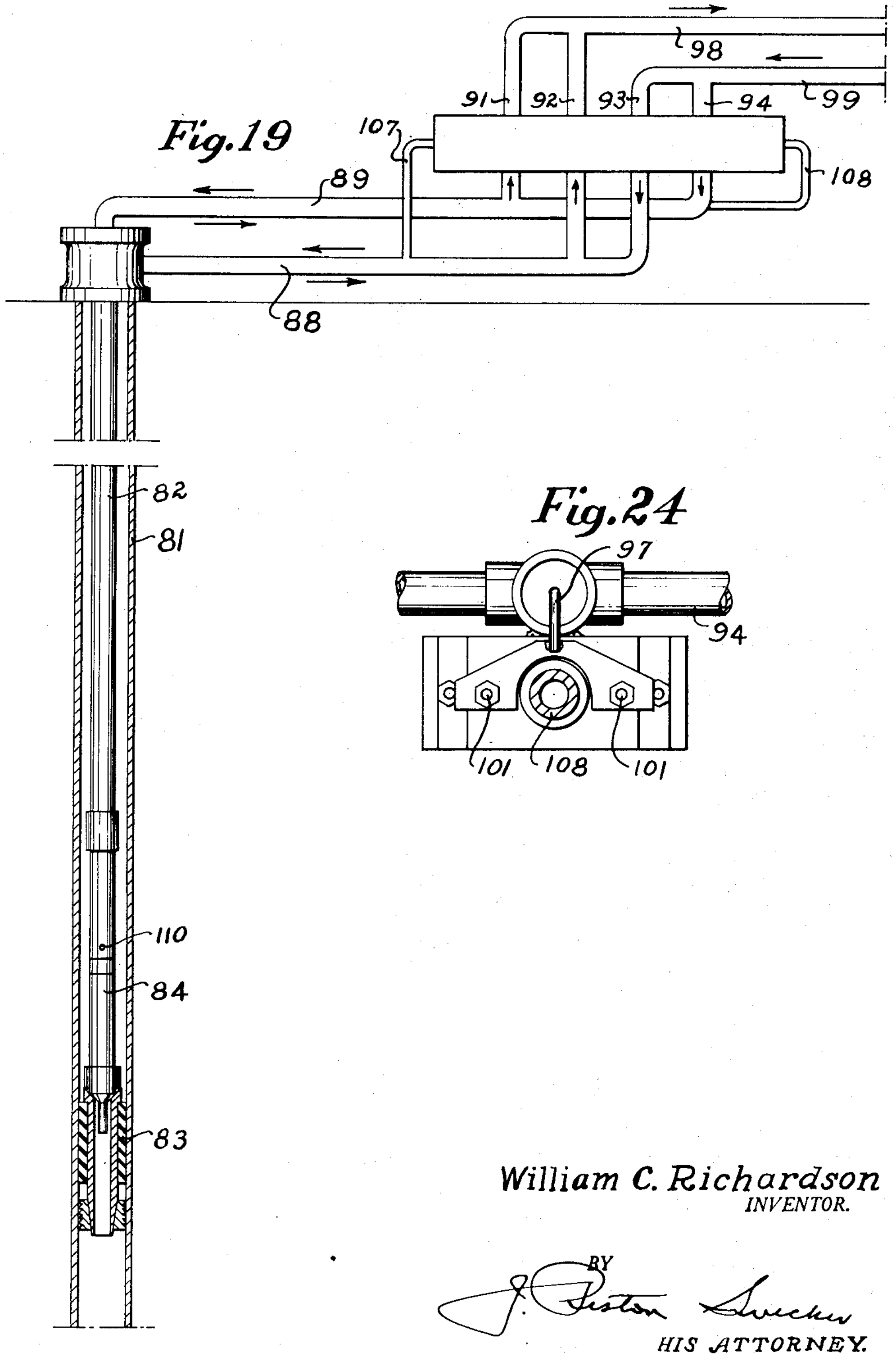
Fig. 19 is a diagrammatic view of a pump system of modified form installed in a well and with parts in section.
Fig. 24 is a cross section through the valve control mechanism substantially on the line 24—24 in Fig. 22.
Figures 20, 21:
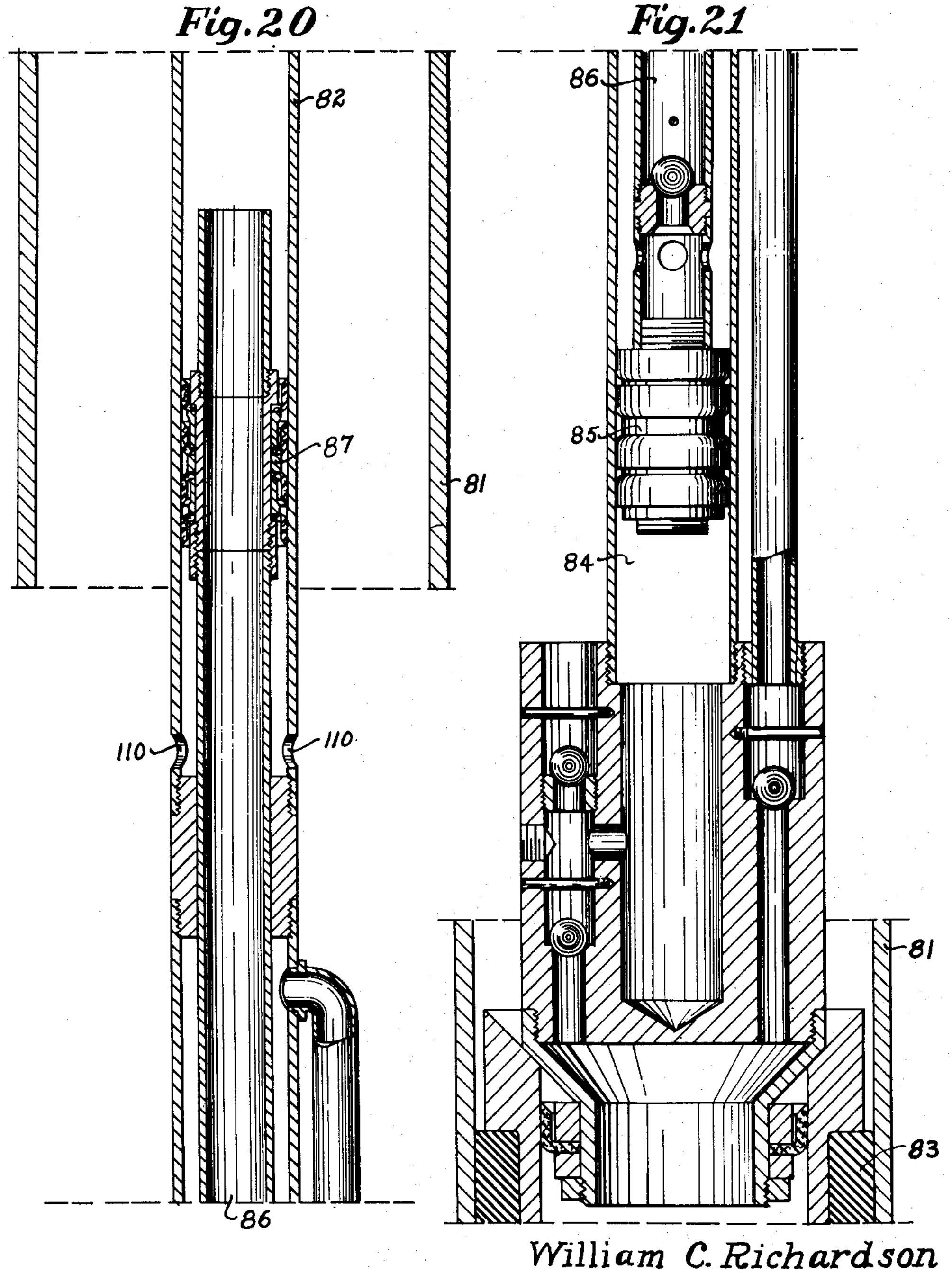
Figs. 20 and 21 are vertical sectional views through the modified form of the pump mechanism as shown in Fig. 19 taken successive at upper and lower portions thereof.

The slide members 54 have shoulders 54b and 54c at each end thereof, which shoulders engage plates 49 and 50, respectively, so as to move the slide members 54 when the plates 49—50 move from the position shown in dot-dash outline to that shown in full lines, and vice versa, in Fig. 13, when the plates 49—50 approach the end of the stroke, so that the beveled faces 54d and 54e of the slide members 54 act upon angular shoulders 55a and 55b to swing the latch member 55 about a central pivotal point.

Each latch 55 has a shoulder 56 adjacent each opposite end thereof, which shoulder is adapted to engage plates 49 and 50 alternately as the slide member 54 slides back and forth and depresses the end of latch 55 to engage the slide member, which will permit the release of the other plate, either 49 or 50, simultaneously with the engagement of shoulder 56 on latch 55.

The plates 49 and 50 are separated also by a coiled spring 58 sleeved over a rod 59 and confined by abutments 60 and 60'. At its opposite ends the rod 59 is provided with pistons 61 and 62 operatively mounted in cylinders 63 and 64, respectively.

The plates 49 and 50 are moved a predetermined longitudinal distance by pistons 61 and 62 acting upon piston rod 59. Stops 60 and 60' positioned on piston rod 59 engage plates 49—50 respectively. The movement of pistons 61 and 62 compresses spring 58 as well as springs 51 and 52 by action of stop member 60 or 60', moving from the position indicated in dot-dash outline to that shown in full outline in Fig. 13.

While the piston is compressing springs 51, 52, and 58 by movement toward the opposite end of the stroke, the stops 53 and valve rods 47 and 48 will remain stationary against longitudinal movement until the plates 49 and 50 reach the end of their stroke exerted by the piston and slide members 54, which causes the latch 55 to engage one of the plates 49—50 and simultaneously release the other of the plates 49—50 at the opposite end, out of shoulders 56 which will permit the combined action of the springs 51, 52, and 58 to act upon stops 53 and valve rods 47 and 48, so as to move these rods and the valves connected therewith to the extreme opposite end of their respective valve chambers, as shown in dot-dash outline. In so doing, the various passages will direct the hydraulic fluid through the courses as will be explained more fully hereinafter.

It is pointed out that the effective surface area of pistons 61 and 62 is such that, when the hydraulic power for pumping the well is applied to a piston of a predetermined area, the combined compression strength of springs 51, 52 and 58 is slightly in excess of the hydraulic power exerted on the effective surface area of piston 61 or 62. By having springs of this compression strength, it will permit pistons 36 and 38 of the hydraulic power operating mechanism to be forced completely to the end limit of their stroke and to build up a slight back pressure before the compression of the springs 51, 52, and 58 starts by action of piston 61 or 62, and which springs in turn actuate the valve switching mechanism.

The cylinder 63 is connected through a conduit 65 with the pipe 6 as will be evident from Fig. 2. In similar manner, the cylinder 64 is connected through a conduit 66 with the pipe 7.

The pipes 6 and 7 are shown in Fig. 2 as extending to the inlet ports respectively of the valves 43 and 45. The discharge sides of the valves 43 and 45 are connected with pipes 67 and 68 which are joined together and to a pipe 69 that leads to the supply tank 1.

The fluid pressure pipe 4 is connected with the inlet ports of the valves 44 and 46 respectively through connections 70 and 71. The outlet ports of the valves 44 and 46 are connected through pipes 72 and 73 respectively with the pipes 6 and 7 for discharging thereto.

It will be evident that the valves 43 and 45 and the valves 44 and 46 are so connected together as to be in open and closed positions alternately, as shown in Fig. 13. Thus, the valves 43 and 46 are open while the valves 44 and 45 are closed and the positions of these are shifted alternately.

*Operation*

Where the pump is to be used for oil wells, a sufficient supply of crude oil is available ordinarily and can be stored in the tank 1 for use in the system. This oil will be withdrawn from the tank and into the pump by the power pump 3, which directs it through the pipe 4 and the open valve 46 into the supply pipe 7. This pipe 7 is connected with the inner tubing 12 so that the oil will be directed down through this tubing to the lower end thereof where it is trapped by the valve 35 (Fig. 5).

Figure 4:
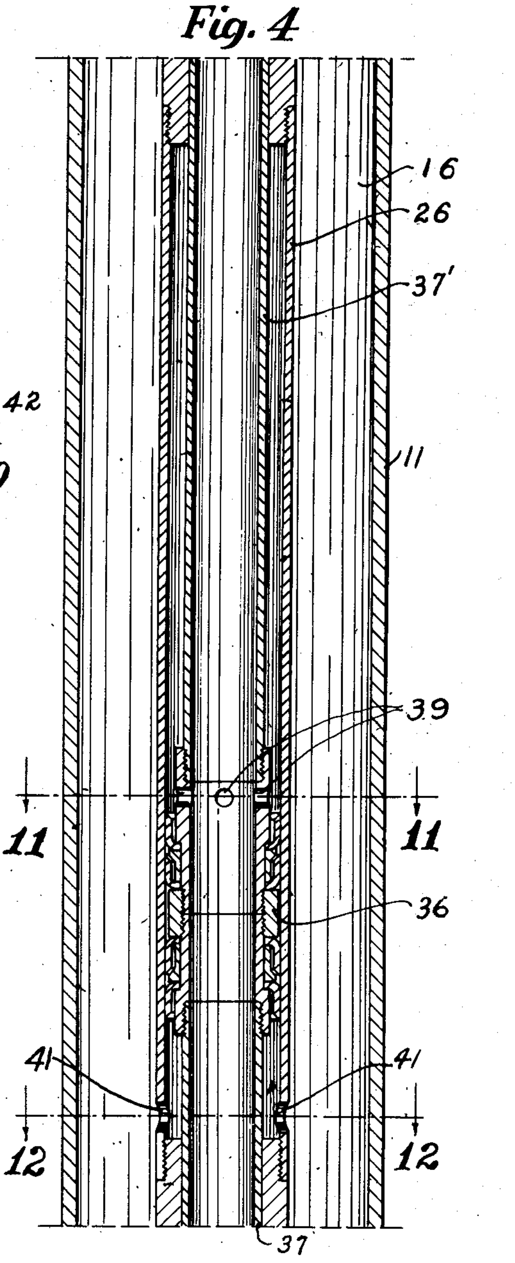

At the same time, as pressure builds up in the tubing 12, this pressure will act on top of the piston 38 and also, through the holes 39, on top of the piston 36, to move the tubular piston rods 37 and 37′ downward, thereby forcing the piston 32 in a downward direction, substantially to the positions of these parts shown in Figs. 3 to 5.

The downward movement of the piston 32 will create a suction in the upper portion of the pump barrel 27 which will draw oil into this pump barrel through the pipe 31 past the check valve 22 and through the passageway 21 in the fitting 14. At the same time the downward motion of the piston 32 will force the oil previously trapped in the cylinder 28 out through the port 20 and past the check valve 19, thence upward through the passageway 16. During this action, the power fluid is discharged from the power cylinders 29 and 30 below the pistons 38 and 36, through the orifices 40 and 41 into the passageway 16 where it becomes mixed with the oil pumped out of the bottom of the well. This is not objectionable, however, because it is the same crude oil and such an arrangement saves the necessity for an extra pipe which would be required otherwise to direct the oil back to the surface of the ground.

When the pistons 38 and 36 reach the limit of their downward stroke, to the positions shown in Figs. 3 to 5, back pressure is built up in the tubing 12 which is communicated through the pipe 7 and pipe 66 to the cylinder 64. This pressure acts on the piston 62 therein tending to move this piston toward the left in Fig. 13. As the piston rod 59 is moved forward, it compresses the spring 58 until the plate 50 has moved forward to engage the shoulder 54*c* to move the slide member 54 until the plate 50 is within the confines of the notches at the end of the latch 55, at which time the bevel face 54*e* on the slide member 54 will have engaged tapered shoulder 55*b* to depress the latch 55 sufficiently to engage the plate 50. Since this movement has compressed springs 51, 52, and 58, the resilient power built up by these springs will move the plate 49 to the position indicated by the dot-dash outline in Fig. 13 and at the same time act upon stops 53 positioned on valve rods 47 and 48 so as to move the valves 43—46 inclusive, to the extreme left, as indicated in dot-dash outline, in their respective cylinders.

When this occurs, the oil is then forced through the pipe 4 and the open valve 44 in its opposite extreme position, into the tubing 6 that is connected with the tubing 11. This oil under pressure will then be forced downward in the tubing 11 where it enters the openings 40 and 41 below the pistons 38 and 36 and moves these pistons upward in the cylinders 29 and 30. This action causes an upward movement of the pump piston 32, thereby sucking oil into the lower end of the cylinder 28 past the check valve 18. The oil in the upper portion of the cylinder 28 is expelled therefrom through the openings 34 and past the check valve 35, where it passes out through the tubing 12. The oil in the upper portions of the cylinders 29 and 30 that served as a power fluid on the preceding stroke, likewise is discharged through the tubing 12.

The discharge through the tubing 12 is directed through the then open valve 45 into the pipe section 68, thence through the pipe 69 to the storage tank 1. On the previous stroke, the oil discharged through the pipe 6 was directed through the open valve 43 into the pipe 69.

As the pistons 38 and 36 reach the upper limits of their strokes, back pressure is built up in the pipe 6 which is communicated through the pipe 65 to the cylinder 63 of the valve mechanism. There the back pressure acts on the piston 61 to move the rod 59 and trip the latches 55. This will allow the valves 43—46 to be shifted to the positions shown in Fig. 13 by the action of the spring 58.

Each of the valves 43—46 is provided with a vent 75 therethrough to facilitate easy movement of the valves and to prevent the trapping of air at one side or the other thereof. Vents 75′ are provided in the ends of the cylinders to facilitate free movement of the valves.

Since the device functions as a double-acting pump, the oil will be drawn into the pump cylinder 28 on both strokes of the pump piston 32, and correspondingly forced upward to the surface on each stroke thereof. In a corresponding manner, the liquid used as the power fluid will be discharged on each stroke of the power pistons into the ejected stream of oil pumped from the well. Thus, both the fluid being pumped such as crude oil, and also the hydraulic fluid used as the power medium, which is preferably the same kind of fluid as the fluid being pumped, are mixed together and are forced upward through the respective discharge conduits to the surface of the ground, and out through the valve mechanism to the source of supply.

This system does not require any small valves such as needle valves or pilot valves, but utilizes full opening full flow valves for controlling the operation thereof. Furthermore, the valve mechanism is not positively connected with the pump mechanism, but is operated through hydraulic means and automatically in response to the movement of the power pistons.

This also facilitates the pulling of the tubing out of the well which is required in some instances. The tubings 11 and 12 can be drawn out of the casing as desired without requiring mechanical disconnection of parts of the pump. Moreover, when the tubing 12 is drawn upward, the oil normally contained therein drains out through the lower end of the tubing and through the discharge nipple 42 into the casing. Then the oil will drain through the same nipple 42 from the upper portion of the tubing 11. This eliminates the waste and danger incident to the draining out of the tubing after this is withdrawn from the well.

*Modified form*

In the form of the invention shown in Figs. 19 to 24, a single tubing is used within a well casing 81, which tubing is designated at 82 and extends downward to the desired point in the casing. The lower end of the tubing 82 is shown as seated upon a packer 83 in the casing.

The tubing 82 has mounted thereon a pump cylinder 84 within which a pump piston 85 is operatively mounted, being connected with a tubular piston rod 86 that extends upwardly to a power piston 87. The power piston 87 is operatively mounted in the tubing 82 and functions substantially in the manner described above. Although a single power piston is used in this form, the pump piston 85 is double-acting and operates substantially in the manner described above in connection with Figs. 1 to 18.

The passageway formed between the casing 81 and the tubing 82 is connected through a pipe 88 with valve mechanism. Also the interior of the tubing 82 is connected through a pipe 89 with the valve mechanism. This valve mechanism is shown more in detail in Figs. 22 and 23.

In this form of valve mechanism, a valve cylinder is designated generally at 90 and has a series of transverse ports 91, 92, 93 and 94, which extend transversely through the cylinder 90 to opposite sides thereof. These ports are controlled by piston valves 95 and 96 fixed on a slidable valve stem 97.

The ports 91 and 92 are connected with a discharge pipe 98. The ports 93 and 94 are connected with an inlet pipe 99 that leads from the fluid pump for supplying oil under pressure from the main supply tank.

The valve stem 97 is connected at its opposite ends with yokes 100 attached to rods 101 which are adapted to be latched in their extreme positions substantially in the manner described above in connection with Fig. 13. The rods 101 have plates 102 connected therewith acted on by a spring 103. These plates 102 are capable of being latched in their extreme positions by latches 104 and when released, the rods 102 will be shifted quickly by the action of the spring 103 to their opposite extreme positions.

A piston device is shown at 105 which extends to opposite sides of the latch mechanism and operates within cylinders 106. These cylinders are connected through by-pass pipes 107 and 108 with the respective pipes 88 and 89 whereby back pressure will build up from the interior of the pump in the well to actuate the piston device 105 and move the control valves 95 and 96 to their respective opposite positions.

Figures 22, 23:
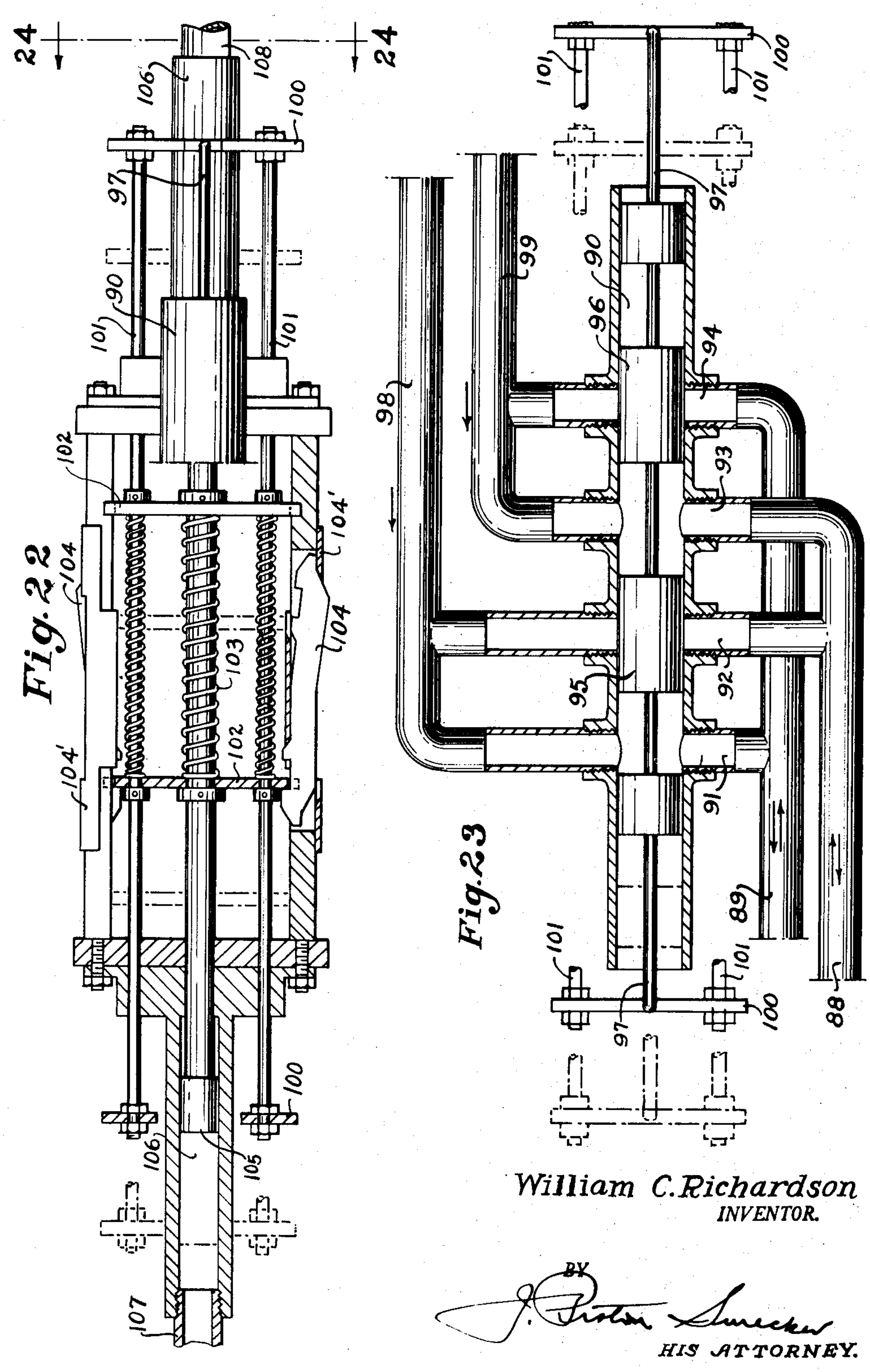
Fig. 22 is a horizontal sectional view partly in elevation showing a modified form of valve control mechanism.
Fig. 23 is a similar view to Fig. 22 but showing the modified form of valve mechanism.

This form of the invention operates substantially in the manner described above in connection with Figs. 1 to 18. As oil is pumped under pressure from the supply tank through the valve port 93 that is uncovered as shown in Fig. 23, this oil will pass through the pipe 88 to the space between the tubing 82 and the casing 81. This oil will enter ports 110 in the sides of the tubing 82 below the piston 87 and force this power piston upward, thereby moving the pump piston 85 in an upward direction. The pump piston will discharge the oil in the upper part of the pump cylinder through the tubular piston rod 86 and at the same time will suck oil into the lower end of the pump cylinder 84. The oil discharged through the tubing 82 will pass out through the pipe 89 and through the uncovered port 91 to the pipe 98, thence back to the suppy tank.

When the pump piston 87 reaches the limit of its upward stroke, back pressure will be communicated through the pipe 107 to act on the piston device 105 of the valve mechanism and move the latter forward to the position shown in Fig. 22. This will shift the valves 95 and 96 to the positions shown in Fig. 23. The operation then will be reversed and the fluid will be discharged under pressure from the supply line 99 through the open port 93 and the pipe 89 to the interior of the tubing 82. This will act as described to cause a downward motion of the pump and power pistons, thereby forcing the oil out of the bottom of the well through the pipe 88 and the casing.

The invention has been described with a modification thereof, but it will be appreciated that other variations and changes may be made in the construction without departing from the invention, except as specified in the claims.

I claim:

1. In a reciprocating pump for wells, the combination of a pump barrel and power cylinders connected in axial alignment, said pump barrel and said power cylinders each having a piston operatively mounted therein, a tubular piston rod interconnecting the respective pistons in axial alignment and extending into said pump barrel and into said power cylinders in telescoping relation, an inlet and an outlet formed in said pump barrel and in each of said power cylinders, a check valve within said tubular piston rod to allow hydraulic fluid to flow in one direction therethrough and to restrain the flow of hydraulic fluid in the opposite direction, a valve timing mechanism connected in fluid pressure relation with the power cylinders for fluid actuation and for directing hydraulic fluid alternately to the opposite power sides of said pistons in said power cylinders for longitudinal movement of said pistons within said respective power cylinders so as to reciprocate said pump piston in said pump barrel, a hole formed in said tubular piston rod intermediate said pump piston and said check valve for escape of a portion of said hydraulic fluid being pumped by said piston in said pump barrel into said tubular piston rod in which a portion of said hydraulic fluid from one of said power cylinders is being discharged on the movement of said pump piston in one direction, and the other of said outlets from said pump barrel being connected to a passageway into which a portion of the hydraulic fluid from said power cylinders discharge upon the movement of the respective pistons in the opposite direction.

2. In a reciprocating hydraulic pump for wells, the combination of a pump barrel and a power cylinder connected in axially aligned relation, a piston operatively mounted in said pump barrel, a second piston operatively mounted in said power cylinder, a piston rod interconnecting said pistons in axially aligned relation for unitary sliding movement in said barrel and said cylinder respectively, a tube connected to said power cylinder and to a source of hydraulic fluid supply for supplying hydraulic fluid under pressure to said hydraulic power cylinder, an outlet formed in and leading from said power cylinder through which hydraulic fluid is discharged, a valved inlet and a valved outlet for said pump barrel for admitting and discharging respectively a hydraulic fluid being pumped, means for controlling the supply and discharge of hydraulic fluid from said power cylinder comprising a plurality of valve members, and pressure actuated means for simultaneously opening certain of said valve members and for closing certain other of said valve members in response to the pressure of said hydraulic fluid to said power cylinder.

3. In a reciprocating hydraulic pump for wells, the combination of a pump barrel and a plurality of hydraulic power cylinders connected in axial aligned relation, a piston operatively mounted in said pump barrel, each of said hydraulic power cylinders having a piston operatively mounted therein, a tubular piston rod interconnecting said pistons in axial aligned relation for unitary sliding movement in said pump barrel and in said hydraulic power cylinders respectively, a check valve within said tubular piston rod near the lower end thereof, a hydraulic fluid outlet for the fluid in the upper end of said pump barrel formed in said tubular connecting rod intermediate said pump piston and said check valve for directing hydraulic fluid being pumped in said pump barrel into said tubular connecting rod on an up-stroke of said pump piston, a valved inlet for admitting hydraulic fluid being pumped to the upper end of said pump barrel on the down-stroke of said pump piston, a valved inlet and a valved outlet connected to the lower end of said pump barrel for directing hydraulic fluid thereinto on the up-stroke of said pump piston and for directing hydraulic fluid therefrom on the down-stroke of said pump piston, said tubular piston rod being in open communication with the upper end of the respective power cylinders, a tubular member connected to the upper end of the upper power cylinder and extending to the top of the well for admitting hydraulic fluid into the upper end of one of the power cylinders and through said tubular piston rod and out through an opening formed therein into the upper end of the other of said power cylinders so as to react on the effective power sides of said pistons to urge said pistons and said tubular connecting rod downward on application of hydraulic fluid pressure thereto, said power cylinders each having an opening formed near the lower end thereof below the bottom side of the effective power sides of said pistons so upon application of hydraulic pressure thereto said pistons will be urged upward so as to discharge the hydraulic power fluid from the upper ends of the respective power cylinders into said tubular member extending to the top of the well, a tubing surrounding said pump barrel and said power cylinders and connected for fluid communication therewith and extending to the top of the well, valve means for controlling the flow of fluid through said tubing and said tubular member which valve means comprises a pair of axially aligned valve cylinders, a piston disposed in each of said aligned valve cylinders, said pistons in said aligned valve cylinders being connected by a rod for unitary movement of said rod and said pistons, each of said valve pistons having a groove adapted to register with a pair of openings formed in the sides of the respective cylinders so as to form a passage between said openings, said valve pistons being of such length as to close said openings in said valve cylinders when said grooves are out of register with said openings, and means responsive to fluid pressure to said power cylinders for alternately moving said valve means into and out of register with certain of said openings in said valve cylinders so as to actuate said pistons in said power cylinders to reciprocate said piston in said pump barrel so as to direct the hydraulic fluid being pumped into the hydraulic fluid being discharged from said power cylinders.

4. In a reciprocating hydraulically actuated well pump, the combination of a pump barrel and a power cylinder connected in axial alignment, a piston slidably mounted in said pump barrel, a second piston slidably mounted in said power cylinder, a piston rod interconnecting said pistons in axial aligned relation for reciprocation of said pistons in said pump barrel and said power cylinder respectively, valve means for admitting hydraulic fluid to be pumped to an inlet formed in said pump barrel, valve means for controlling the discharge of hydraulic fluid being pumped from an outlet formed in said pump barrel, inlet means for admitting hydraulic fluid to said power cylinder and outlet means for discharging hydraulic fluid therefrom, tubular members connected with said hydraulic fluid inlet means and said hydraulic fluid outlet means of said power cylinder and the hydraulic fluid outlet of said pump barrel and extending to the top of said well for selectively directing hydraulic fluid thereinto and therefrom, valve means for controlling the supply and discharge of hydraulic fluid through the respective tubular members and for the direction of flow of hydraulic fluid through the respective tubular members comprising a pair of axially aligned valve cylinders, a piston disposed in each of said aligned cylinders, said pistons in said aligned cylinders being interconnected by a valve rod for unitary movement thereof, each of said pistons having a groove therein which groove is adapted to register with a pair of openings positioned in the sides of the respective cylinders to form a passage therebetween when said grooves are in register with said openings in the respective cylinders, said pistons being of such length as to close said openings when said grooves are out of register therewith, hydraulic fluid actuated means operated automatically in response to the power pressure created at the end of the power stroke of said pump through one of the tubular members for controlling the position of the valve means.

5. In a hydraulic fluid actuated reciprocating well pump, the combination of a pump barrel and a power cylinder connected in axial alignment, a piston slidably mounted in said pump barrel, a second piston slidably mounted in said power cylinder, a piston rod interconnecting said pistons in axial aligned relation for reciprocation of said pistons in said pump barrel and said power cylinder respectively, valve means for admitting hydraulic fluid to be pumped, to an inlet formed in said pump barrel, valve means for controlling the discharge of hydraulic fluid being pumped from an outlet formed in said pump barrel, inlet means for admitting hydraulic fluid to said power cylinder and outlet means for discharging hydraulic fluid therefrom, tubular members connected with said hydraulic fluid inlet means and said hydraulic fluid outlet means of said power cylinder and the hydraulic fluid outlet of said pump barrel and extending to the top of said well for selectively directing hydraulic fluid thereinto, and therefrom, valve means for controlling the supply and discharge of hydraulic fluid through the respective tubular members and for the direction of flow of hydraulic fluid through the respective tubular members comprising a pair of axially aligned valve cylinders, a piston disposed in each of said aligned cylinders, said pistons in said aligned cylinders being interconnected by a valve rod for unitary movement thereof, each of said pistons having a groove therein which groove is adapted to register with a pair of openings positioned in the sides of the respective cylinders to form a passage therebetween when said grooves are in register with said openings in the respective cylinders, said pistons being of such length as to close said openings when said grooves are out of register therewith, and hydraulic fluid actuated means operated automatically in response to the power pressure created at the end of the power stroke of said pump through one of the tubular members for controlling the position of the valve means, and spring actuated latch means for causing snap action of said valve means for causing movement thereof in response to an increase of the pressure at the end of said power stroke.

6. A valve system for use with a reciprocating hydraulic motor and a reciprocating hydraulic pump to be located within a well and which hydraulic motor and hydraulic pump each have a cylinder, each cylinder having a piston therein, a piston rod interconnecting said pistons in aligned relation for sliding movement of said pistons in the respective cylinders to perform a pumping action, which valve system comprises a pair of axially aligned valve cylinders, a piston disposed in each of said aligned cylinders, said pistons in said aligned cylinders being interconnected by a valve rod for unitary movement thereof, each of said pistons having a groove therein which groove is adapted to register with a pair of openings formed in the sides of the respective cylinders to form a passage therebetween when said grooves are in register with said openings in the respective cylinders, said pistons being of such length as to close said openings when said grooves are out of register therewith, a power operated pump for directing hydraulic pressure to said valve system and to the pistons of said reciprocating hydraulic motor, a fluid actuated element for moving a spring actuated trip means to cause bodily shifting movement of said valve pistons so as to direct hydraulic fluid to alternate ends of said hydraulic reciprocating motor so as to change the direction of reciprocation thereof, said fluid actuated element being responsive to fluid pressure at the end of the stroke of said reciprocating hydraulic motor.

7. In a hydraulic power pump system for wells, the combination of a power cylinder with a power piston therein for delivering a reciprocating power stroke, a hydraulic system connected with said power cylinder, a valve system arranged within said hydraulic system intermediate the source of said hydraulic power and said power cylinder, said valve system comprising a cylinder in which a valve actuating piston is slidably positioned for alternate reciprocating movement and being responsive to hydraulic pressure within said hydraulic system leading to said power cylinder, valve shifting means slidably connected to said valve actuating piston in said valve actuating cylinder, a valve cylinder having a wall positioned in aligned relation with said valve actuating piston and said valve actuating cylinder and having axially aligned pistons therein which pistons are spaced apart to form grooves therebetween, openings formed within the wall of said valve cylinder so said grooves will interconnect pairs of said openings to direct hydraulic fluid to one end of said power cylinder when said valve piston is in one position, and will close certain other of said openings formed in said cylinder wall when said valve pistons are in another position, and when said valve pistons are shifted by said valve shifting mechanism to an alternate position, hydraulic fluid will be directed alternately to opposite ends of said power cylinder so as to act alternately on opposite sides of said power piston to actuate a reciprocating pump in a well.

8. In a pump system the combination with a pump having a power cylinder and a piston therein arranged for action through a stroke, of a hydraulic system connected with said power cylinder for supplying fluid under pressure alternately to opposite ends of said piston, a valve connected in said hydraulic system and arranged to control the entrance of said fluid into said power cylinder, a valve control device including a valve cylinder, a valve actuating piston, which valve actuating piston is actuated by the pressure in said hydraulic system when said power piston has reached the end of its stroke, said valve comprising a pair of axially aligned pistons positioned within a cylinder, said pistons being connected in spaced relation by a rod so that the space formed intermediate said pistons within said cylinder surrounding said rod forms an annular groove between said pistons, which grooves is adapted to register with openings formed within the wall of said valve cylinder when said pistons are in one position and said pistons being of such length as to close said openings formed in the wall of said valve cylinder when in another position, and trip means for controlling said valve which trip means has resilient means connected therewith to be compressed by said valve actuating piston to actuate said trip means.

9. In a reciprocating pump for a well, the combination of pump and power cylinders, pistons connected together and operatively mounted one in each of said respective cylinders, means for admitting fluid to the respective cylinders and for discharging fluid therefrom, tubular conduits connected with the fluid admitting and discharging means, valve means for controlling the flow of fluid through said tubular conduits, a valve actuating means comprising a cylinder, a piston slidably mounted in said cylinder and operated automatically in response to fluid pressure in one of said conduits for controlling said valve means, said valve means comprising a valve cylinder having a wall, pairs of axially aligned pistons positioned within said valve cylinder, said pistons being connected in spaced relation by means of a connecting rod so that the space within said cylinder between said pistons surrounding said connecting rod forms a groove, which groove is adapted to register with openings formed within said cylinder wall when said pistons are in one position and which pistons are of such length as to close said openings formed in said cylinder wall when in another position, means for supporting said pump and said power cylinders in a well, and means for mounting said control valve means externally of said well.

10. In a reciprocating pump, the combination of pump and power cylinders connected in axial alignment, pistons connected together and operatively mounted, one in each of said respective pump and power cylinders in axial relation, means for admitting fluid to said pump cylinder and for discharging fluid therefrom, means for admitting fluid to said power cylinder and for discharging fluid therefrom, tubular conduits connected with the fluid admitting and discharge means of the respective pump and power cylinders, valve means for controlling the supply and discharge of fluid through the respective conduits and for changing the direction of flow of fluid through the respective conduits, valve means operated automatically in response to pressure through one of said tubular conduits when said piston in said power cylinder reaches the end of its stroke so as to actuate said valve means, said valve means comprising a valve cylinder having ports formed therein which ports are in communication with said tubular conduits, and a pair of axially aligned valve pistons connected together by a valve rod and spaced apart from a similar pair of axially aligned valve pistons, a pair of fluid actuated pistons positioned intermediate and in aligned relation with said pairs of spaced axially aligned valve pistons and resiliently connected with said valve rod of said valve pistons, and spring-actuated latch means for causing snap action of said valve means to move it in response to said pressure at the end of the stroke of said piston in said power cylinder, said latch means being adapted to control the positioning of said valve means for shifting said valve means from one position to another without closing the respective intake and discharge ports simultaneously.

WILLIAM C. RICHARDSON.

REFERENCES CITED

The following references are of record in the file of this patent:

UNITED STATES PATENTS

| Number | Name | Date |
|---|---|---|
| 533,817 | Keenan | Feb. 5, 1895 |
| 668,782 | Torrance | Feb. 26, 1901 |
| 1,392,697 | Neesham | Oct. 4, 1921 |
| 1,435,921 | Grossenbacher | Nov. 21, 1922 |
| 1,477,578 | Marsh | Dec. 18, 1923 |
| 1,643,616 | Zin et al. | Sept. 27, 1927 |
| 1,659,335 | Smyster | Feb. 14, 1928 |
| 1,745,566 | Yerkes | Feb. 4, 1930 |
| 1,750,146 | Wray | Mar. 11, 1930 |
| 1,765,457 | Shutt | June 24, 1930 |
| 1,828,857 | Coberly | Oct. 27, 1931 |
| 1,933,848 | Gage | Nov. 7, 1933 |
| 2,018,215 | Lausen | Oct. 22, 1935 |
| 2,042,190 | Ragan | May 26, 1936 |
| 2,245,501 | Richardson | June 10, 1941 |
| 2,309,897 | Hall | Feb. 2, 1943 |
| 2,459,148 | Christensen | Jan. 18, 1949 |